United States Patent [19]

Hall

[11] Patent Number: 4,503,475
[45] Date of Patent: Mar. 5, 1985

[54] TAPE CLEANER

[76] Inventor: Gardner L. Hall, P.O. Box 216, Plymouth, N.H. 03264

[21] Appl. No.: 415,802

[22] Filed: Sep. 8, 1982

[51] Int. Cl.³ .................... G11B 15/00; B08B 11/02
[52] U.S. Cl. ................................ 360/137; 15/97 R; 15/DIG. 13; 360/94
[58] Field of Search .............. 360/128, 137, 94; 15/DIG. 12–DIG. 14, 99–100, 97, 256.5; 242/197, 200

[56] References Cited

U.S. PATENT DOCUMENTS 4,004,314  1/1977  Post .................. 360/137 X
4,324,014  4/1982  Stutz ................. 360/137 X

*Primary Examiner*—A. J. Heinz

[57] ABSTRACT

Tape cleaning apparatus comprising a platform having an upstanding wall at one end is disclosed. Upper and lower means are provided in the wall for receiving pads to clean, lubricate, and impart anti-static treatment to tape in cassettes when positioned thereagainst. Members on the platform extend thereabove for mounting and positioning cassettes with exposed tape portions in cleaning positions adjacent the pad receiving means. A first set of members, including a clip member, is positioned to engage the rear of a dual reel cassette in the lower position adjacent the platform. A second set of members is spaced rearwardly of the position of the dual reel cassette and extends thereabove to support a continuous loop cassette in an elevated position above that of the dual reel cassette, the members of the first set having a height below the minimum height above the platform of the continuous loop cassette. A pair of spindles is provided in the platform positioned to project through the reel hubs of a dual reel cassette, at least one spindle being adapted to engage the reel hub through which it projects. The engaging spindle and a roller in the upstanding wall positioned to engage tape against an idle roller in the continuous loop cassette provide the drive means for moving tape in the cassettes.

10 Claims, 4 Drawing Figures

TAPE CLEANER

BACKGROUND OF THE INVENTION

This invention relates to the cleaning of magnetic tape contained in a cassette, without removal of the tape therefrom.

It is well known that magnetic tapes used in computers, and in video and audio recording, must be kept free from particles of oxide or foreign matter. When such particles accumulate on the tape, especially on its oxide surface, they adversely interfere with the signal efficiency of the recording and reading heads of the recording device used in conjunction with the tape. This is so because proper contact cannot be uniformly maintained between the recording, or read-out, head and the tape. This, together with the erratic interposing of particles of oxide or foreign matter between the heads and tape, is likely to impair the accuracy of recording and reading.

In the past, devices have been used to clean magnetic tape in a cassette, without the necessity of removal of the tape therefrom. Such devices however, have been capable only of cleaning tape in one type of cassette, reel to reel or continuous loop. Some such devices have not provided ready replacement of the cleaning means or have been of complicated design.

SUMMARY OF THE INVENTION

It is the object of this invention to provide a simple tape cleaning apparatus adapted to clean tape in either reel to reel or continuous loop cassettes. It is a further object to provide apparatus which optionally can clean tape in either type cassette. It is yet another object to provide apparatus in which the tape cleaning means can readily be replaced as required.

In general, the invention features apparatus comprising a platform adapted to be horizontally oriented having an upstanding wall at one end. Upper and lower means are provided in the wall for receiving pads to clean, lubricate and impart anti-static treatment to tape in cassettes when positioned thereagainst. Members on the platform extend thereabove for mounting and positioning cassettes with exposed tape portions in cleaning positions adjacent the pad receiving means. A first set of members, including a clip member, is positioned to engage the rear of a reel to reel cassette in the lower position adjacent the platform. A second set of members is spaced rearwardly of the position of the reel to reel cassette and extends thereabove to support a continuous loop cassette in an elevated position above that of the reel to reel cassette, the members of the first set having a height below the minimum height above the platform of the continuous loop cassette. A pair of spindles is provided in the platform positioned to project through the reel hubs of a reel to reel cassette, at least one spindle being adapted to engage the reel hub through which it projects. The engaging spindle, and a roller in the upstanding wall positioned to engage tape against an idler roller in the continuous loop cassette, provide the drive means for moving tape in the cassettes.

Other advantages and features of the invention will be apparent from the following description of preferred embodiments thereof, and from the claims.

DESCRIPTION OF THE PREFERRED EMBODIMENTS

The structure and operation of the preferred embodiment will now be described, after first briefly describing the drawings thereof.

DRAWINGS

STRUCTURE

Figure 1:
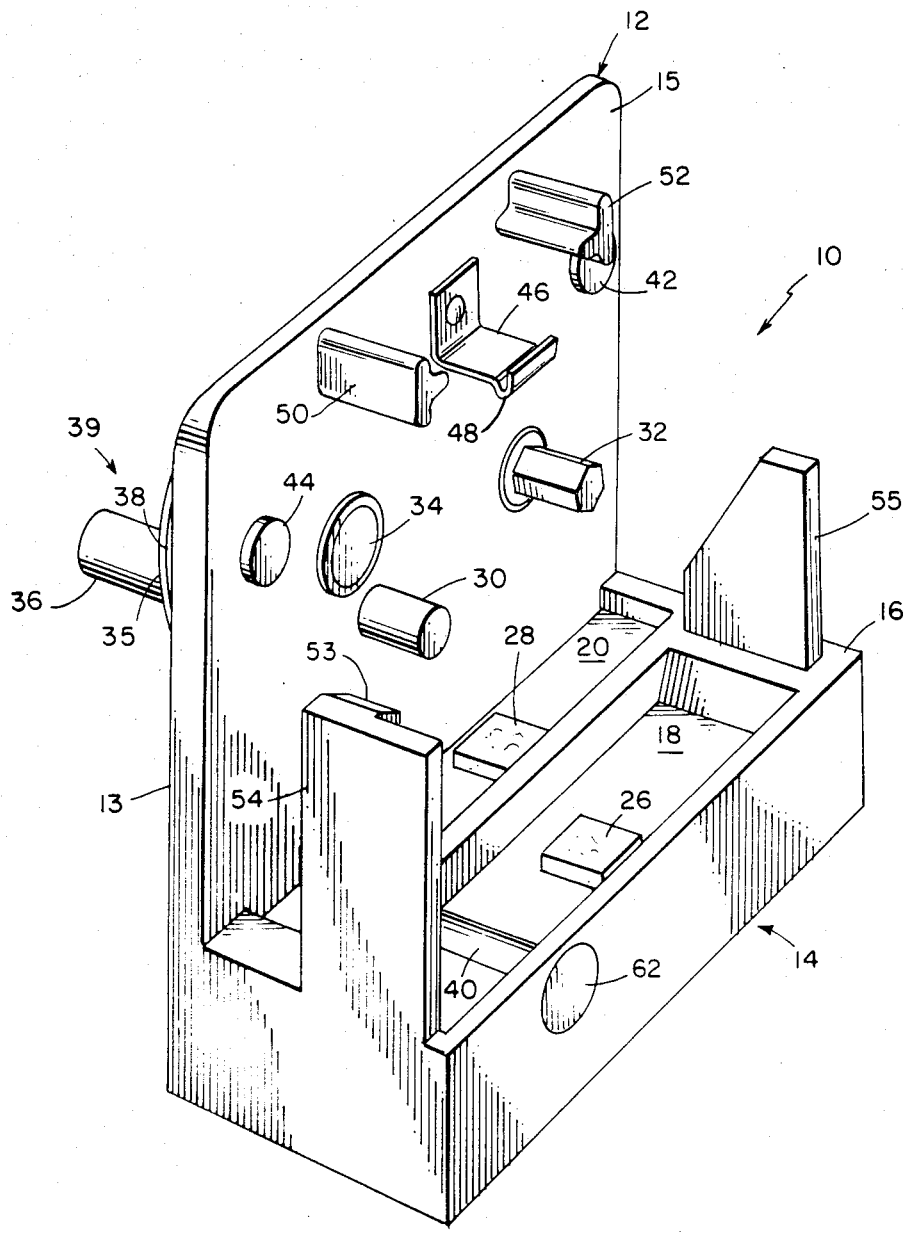
FIG. 1 is an isometric view of a tape cleaner embodying the invention.

Referring to FIGS. 1–4, the tape cleaner 10 comprises a horizontally oriented platform 12 and an integral end portion 14 extending above the platform at one end on the cassette mounting side 15 thereof. The wall 16 of end portion 14, perpendicular to and facing platform 12 has upper and lower recesses 18, 20, respectively adapted to receive the ends of continuous loop (e.g. 8 track audio) and dual reel cassettes. Within each recess 18, 20 is means comprising a cavity 22, 24 for receiving a treatment pad 26, 28, best shown in FIG. 4.

Spindle 30 is rigidly, and drive spindle 32 is rotatably, mounted in platform 12 and project above the cassette mounting side 15 to a position below upper recess 18. Spindle 30 is of uniform circumference, whereas, spindle 32 has angular surfaces about its circumferences to engage the teeth of the hub of one of the reels typically employed in dual reel cassettes. Drive spindle 32 projects through a raised flange on the opposite or crank side 13 of platform 12 and has a reduced diameter which is press fitted into sheave 37. Spindle 30 is held in position by any suitable retainer ring (not shown), which prevents it from rotating. The spindles 30, 32 are spaced from recess 20 such that a cassette thereon will engage exposed tape against pad 28.

Members 42, 44 extend above the platform 12 opposite end portion 14 to support the rear corners of a dual reel cassette to ensure that the cassette is parallel to the platform surface 15 when in position for cleaning. The height of support members 42, 44 is equal to the height of the enlarged portion of a standard cassette adjacent the opening which exposes tape for recording and playback. Clip member 46 is riveted to platform 12 and extends above platform 12 opposite end portion 14. The upper portion of clip member 46 is contoured to form lip 48 which, upon insertion of the cassette, extends over a portion of the rear of its upper surface, thus gripping said rear portion and maintaining the cassette firmly in position in recess 20 against pad 28. Clip 46 has a height above surface 15 about equal to the height of lower recess 20 and in any event less than the height at which upper recess 18 commences.

Spaced rearwardly of supports 42, 44, and clip 46, are support post members 50, 52 for supporting the rear portion of a standard continuous loop cassette. Posts 50, 52 extend above surface 15 to a height greater than that of clip 46 to support a continuous loop cassette in parallel relationship to platform surface 15 when the cassette is in recess 18. Other post members, 54, 55, integral with surface 16 are positioned on either side of end portion 14 and extend perpendicularly from wall 16 and above platform 12. Integral with post member 54, and projecting inwardly thereof, is finger 53 which extends a distance to engage the cavity walls of the typical notch recess found in the side of continuous loop cassettes; the height of finger 53 is such that it engages the downwardly facing cavity wall of the cassette notch recess for additional support.

Side walls 56, 58 of recess 18 are formed at angles complementary to the angles of the cassette at the front end thereof. Post members 54, 55 are positioned to cause the cassette to be firmly engaged against side walls 56, 58 in recess 18.

A drive roller 40 extends through end portion 14 to the underside 13 of platform 12, being passed through a countersunk hole in the top of end portion 14, enlarged head portion 62 limiting insertion. The opposite end of roller 40 is secured by a press fit to sheave 57. Roller 40 is positioned to protrude partially into recess 18 to engage the tape against the idler wheel in a continuous loop cassette. Due to the fact that recess 20 is not as deep as recess 18, however, roller 40 is not exposed in recess 20.

Figure 4:
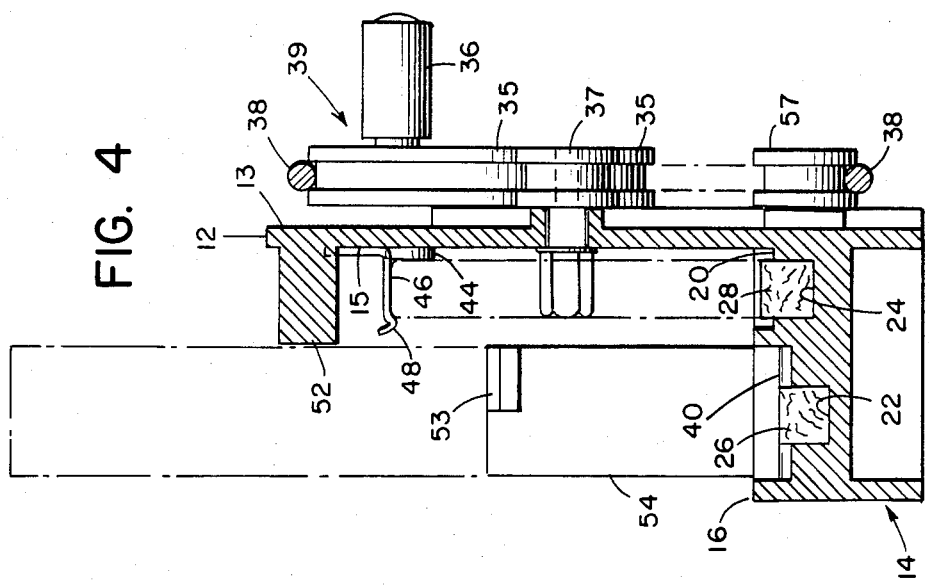
FIG. 4 is a sectional view, taken at 4—4 of FIG. 2, of the tape cleaner with the positioning of dual-reel and continuous-loop cassettes schematically shown in broken lines.
Figure 3:
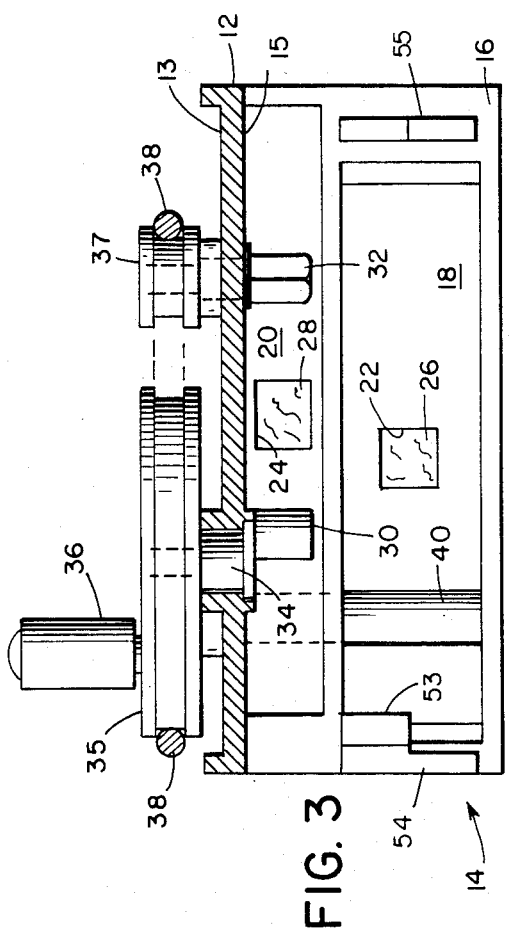
FIG. 3 is a sectional view, taken at 3—3 of FIG. 2, of the tape cleaner.
Figure 2:
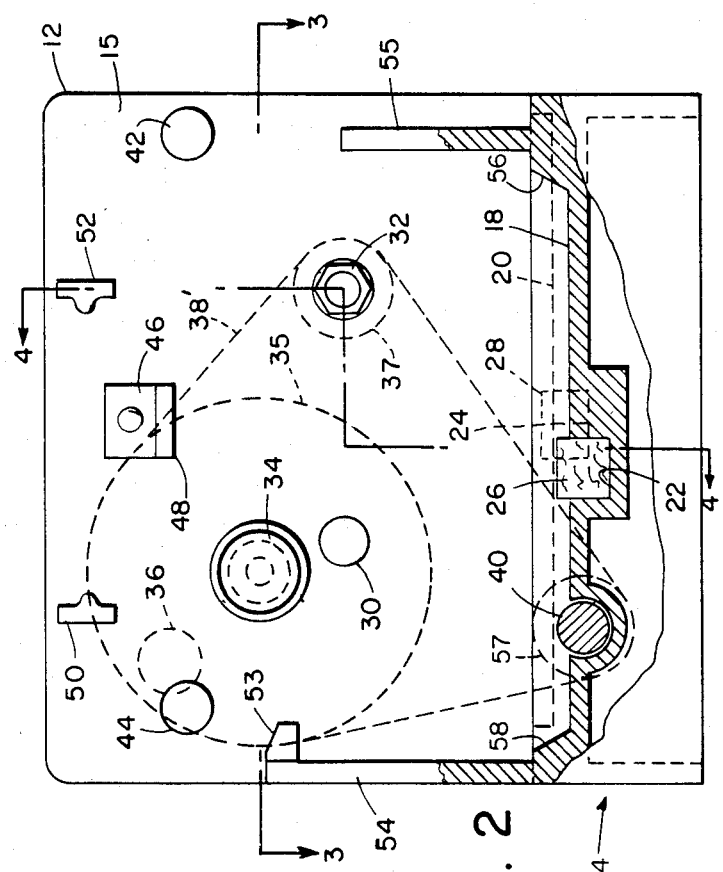
FIG. 2 is a partly sectioned plan view of the side of the tape cleaner on which cassettes are placed.

Shaft member 34 rotatably supports sheave 35 on the underside 13 of platform 12. Crank handle 36 is secured to sheave 35 to permit manual rotation thereof. Drive belt 38 connects sheave 35 with either sheave 37 or sheave 57 for rotation thereof (as shown in FIGS. 3 and 4). Optionally, a drive belt 38' may be connected to sheaves 35, 37 and 57 for simultaneous rotation (as shown in FIG. 2).

Cavities 22, 24 are located in recesses 18, 20 in position such that pads 26, 28 will engage the tapes of cassettes positioned in the recesses.

Pads 26 and 28 are of absorbent soft material, e.g., plastic foam, non-woven bulky fabric or felt. In preferred embodiments, an anionic lubricating surfactant, such as GAFAC GB-520 (a product of GAF Corporation of Linden, N.J.), diluted with water, is combined with a hydrophlic urethane prepolymer, such as Hypol FHP 2000 (a product of W. R. Grace and Company), to which is added a lubricant, such as polyethylene glycol 400 monolaurate, the proportions of surfactant and lubricant being each between 0.1% and 25%, but preferably 5%. The resulting foam is then cut to the dimensions of cavities 22 and 24. If felt or bulky fabric is used, the pads are impregnated with a water diluted anti-static surfactant, such as GAFAC RD-510, and a lubricant, such as polyethylene glycol 400 monolaurate, the proportions of surfactant and lubricant being each between 0.1% and 25%, but preferably 5%. The surfactant, together with the mildly abrasive action of the pad, removes surface dirt and contamination from the tape and deposits thereon a very thin film having lubricating and anti-static characteristics. The anti-static treatment of the tape minimizes tape "noise" and reduces dust contamination of the tape, while the lubricant promotes smooth passage of the tape.

When the pads are contaminated they may simply be removed from the cavities and replaced with new pads.

Recesses 18, 20 prevent vertical misalignment and movement of cassettes inserted therein.

OPERATION

In operation, in the case of dual-reel cassettes, the exposed-tape-end of the cassette is inserted into recess 20 and the body of the cassette pressed toward platform 12 so as to come to rest on supports 42 and 44, clip 46 firmly securing the cassette in place; in the case of continuous-loop cassettes, the exposed-tape-end of the cassette is inserted into recess 18, with the rear of the body of the cassette resting on posts 50 and 52, and finger 53 inserted inside the notch recess in the cassette body. Crank member 39 is manually rotated by turning handle 36. That rotational motion is communicated, through drive belt 38, to either drive member 57 or 37, or both (as described above), which, being coupled to roller 40 and spindle 32 respectively, cause the roller and spindle to revolve. In the case of dual-reel cassettes, the rotation of spindle 32 engages the teeth typically found at the hub of the spools and enables the spool to be rotated, thereby advancing the tape (not shown) across cleaning pad 28 which contacts, and presses against, the tape thereby removing loose particles of oxide or dirt by an abrasive action, and providing its lubricating and anti-static treatments. In the case of continuous-loop cassettes, roller 40 presses the exposed tape against the internal roller typically found in this type of cassette, thereby frictionally advancing the tape across cleaning pad 26 and effecting the same treatment of the tape as that described above for dual-reel cassettes.

Other embodiments are within the following claims.
What is claimed is:

1. Apparatus for cleaning magnetic tapes in dual reel or continuous loop cassettes comprising:
    a platform adapted to be horizontally positioned;
    a wall extending upwardly, away from one end of said platform;
    a first means for receiving in said wall a first tape cleaning pad to engage exposed portions of tape in cassettes, said first pad-receiving means being spaced above said platform;
    a second means for receiving in said wall a second tape cleaning pad to engage exposed portions of tape in cassettes, said second pad-receiving means being spaced above said first pad receiving means;
    a first set of cassette-holding members extending upwardly, away from said platform and spaced from said wall, said first set of members being adapted to position and hold a first, dual reel, cassette in an operative position above said platform with its exposed tape portion positioned for contact with said first pad, a pair of said members of said first set being spaced apart in positions for supporting the rear portion of said dual reel cassette;
    a second set of cassette-holding members, extending upwardly, away from said platform and spaced further from said wall than said first set of members, said second set of members being adapted to position and hold a second, continuous loop, cassette in an operative position spaced above said dual reel cassette with its exposed tape portion positioned for contact with said second pad, each of said members of said second set being spaced from said wall a distance greater than the distance said dual reel cassette extends from said wall when said dual reel cassette is in its said operative position and less than the distance said continuous loop cassette extends from said wall when said continuous loop cassette is in its said operative position, the members of said second set being spaced apart a distance less than the distance between the sides of said continuous loop cassette, said members of said first set extending upwardly, away from said platform a distance less than the spacing between said platform and the continuous loop cassette when it is in its said operative position, said members of said second set extending upwardly from said platform a distance greater than the distance said dual reel cassette extends above said platform in its operative position;

a pair of spindles in said platform positioned to project through the hubs of the reels of a dual reel cassette, at least one of said spindles being adapted to engage one of said hubs; and drive means for driving tapes in said cassettes, said drive means comprising said one spindle and a roller mounted in said wall positioned to engage tape against an idler roll in said continuous loop cassette.

2. The apparatus claimed in claim 1 further comprising upper and lower recesses in said wall sized, respectively, to receive therein the portions of said second and first cassettes having exposed portions of tape for restraining movement of said cassettes; said roller exposed in said upper recess; and said upper and lower pad receiving means positioned in said recesses.

3. The apparatus claimed in claim 2 further comprising angular surfaces on the sides of said upper recess adapted to engage corresponding angular walls on said second, continuous loop, cassette, and post members positioned adjacent the sides of said platform, one said post member having means for locking engagement in a notch recess in said second cassette, the height of said post members above said platform being greater than the height of said first cassette when it is positioned in its said operating position.

4. The apparatus claimed in claim 3 wherein said post members extend from said upstanding wall and overhang said platform.

5. The apparatus claimed in claim 2 further comprising a clip member being at least one member of said first set for locking engagement with the rear portion of said first, dual reel, cassette.

6. The apparatus claimed in any one of claims 2, 3, 4, or 1 in which said drive means further comprises a drive belt, said one spindle and said roller extend through said platform and each have a sheave connected thereto on the other side of said platform, and a third sheave having a crank handle for manual operation, also positioned on the other side of said platform, said drive belt interconnecting said third sheave with at least one of the other said sheaves.

7. The apparatus claimed in claim 6 in which said drive belt interconnects all said sheaves for simultaneous rotation of said one spindle and said roller.

8. The apparatus claimed in any one of claims 2, 3, 4, or 1 in which said pad receiving means comprises a cavity in said wall.

9. The apparatus claimed in any one of claims 2, 3, 4, or 1 in which said pad is impregnated with anionic and lubricating solutions.

10. The apparatus claimed in any one of claims 2, 3, 4, or 1 or 8 in which said pad has abrasive properties.

* * * * *